United States Patent
Kafai et al.

(10) Patent No.: US 11,169,964 B2
(45) Date of Patent: Nov. 9, 2021

(54) HASH SUPPRESSION

(71) Applicant: Hewlett Packard Enterprise Development LP, Houston, TX (US)

(72) Inventors: Mehran Kafai, Palo Alto, CA (US); Kave Eshghi, Palo Alto, CA (US); Omar Aguilar Macedo, Tlaquepaque (MX)

(73) Assignee: Hewlett Packard Enterprise Development LP, Houston, TX (US)

( * ) Notice: Subject to any disclaimer, the term of this patent is extended or adjusted under 35 U.S.C. 154(b) by 558 days.

(21) Appl. No.: 16/073,961

(22) PCT Filed: Dec. 11, 2015

(86) PCT No.: PCT/US2015/065339
§ 371 (c)(1),
(2) Date: Jul. 30, 2018

(87) PCT Pub. No.: WO2017/099806
PCT Pub. Date: Jun. 15, 2017

(65) Prior Publication Data
US 2020/0167312 A1    May 28, 2020

(51) Int. Cl.
*G06F 7/00* (2006.01)
*G06F 16/13* (2019.01)

(52) U.S. Cl.
CPC .................. *G06F 16/137* (2019.01)

(58) Field of Classification Search
CPC ...... G06F 16/355; G06F 16/35; G06F 21/562; G06F 21/561; G06F 16/137;
(Continued)

(56) References Cited

U.S. PATENT DOCUMENTS 6,754,662 B1    6/2004  Li
9,009,029 B1    4/2015  Michalak et al.
(Continued)

FOREIGN PATENT DOCUMENTS

WO    WO-2006130803    12/2006
WO    WO-2015061972    5/2015

OTHER PUBLICATIONS

Dehmer, M. et al.; "Information Indices with High Discriminative Power for Graphs"; Feb. 29, 2012; 17 pages.
(Continued)

*Primary Examiner* — Azam M Cheema
(74) *Attorney, Agent, or Firm* — Hewlett Packard Enterpise Patent Department

(57) ABSTRACT

An example method is provided in according with one implementation of the present disclosure. The method comprises generating, via a processor, a set of hashes for each of a plurality of objects. The method also comprises computing, via the processor, a high-dimensional sparse vector for each object, where the vector represents the set of hashes for each object. The method further comprises computing, via the processor, a combined high-dimensional sparse vector from the high-dimensional sparse vectors for all objects and computing a hash suppression threshold. The method also comprises determining, via the processor, a group of hashes to be suppressed by using the hash suppression threshold, and suppressing, via the processor, the group of selected hashes when performing an action.

12 Claims, 5 Drawing Sheets

(58) Field of Classification Search
CPC ............ G06F 16/2237; G06F 16/2255; G06K 2009/4695; G06N 20/10; G06T 9/00; H04L 45/7453
See application file for complete search history.

(56) References Cited

U.S. PATENT DOCUMENTS

| | | | |
|---|---|---|---|
| 2006/0036564 A1 | 2/2006 | Yan et al. | |
| 2007/0130188 A1* | 6/2007 | Moon | ................... H04L 9/3231 |
| 2010/0077015 A1 | 3/2010 | Eshghi et al. | |
| 2014/0324742 A1* | 10/2014 | Eshghi | ................... G06N 20/00 706/12 |
| 2015/0096023 A1* | 4/2015 | Mesdaq | ................ G06F 21/566 726/23 |

OTHER PUBLICATIONS

Paratte, J.; "Sparse Binary Features for Image Classification"; 2013; 72 pages.
PCT International Search Report issued in Appl. No. PCT/US2015/065339; dated Aug. 31, 2016; 3 pages.
Syed, Z. et al.; "Learning Approximate Sequential Patterns for Classification"; Sep. 2008; 24 pages.

* cited by examiner

HASH SUPPRESSION

A variety of analytic tasks may be performed on data (e.g., big data that generally exceeds the processing capacity of conventional systems), and the results may be provided to a user. The analytics tasks may include creating and running queries, indexing, retrieval, clustering, pattern detection, classification, and others.

DETAILED DESCRIPTION OF SPECIFIC EXAMPLES

Figure 1:
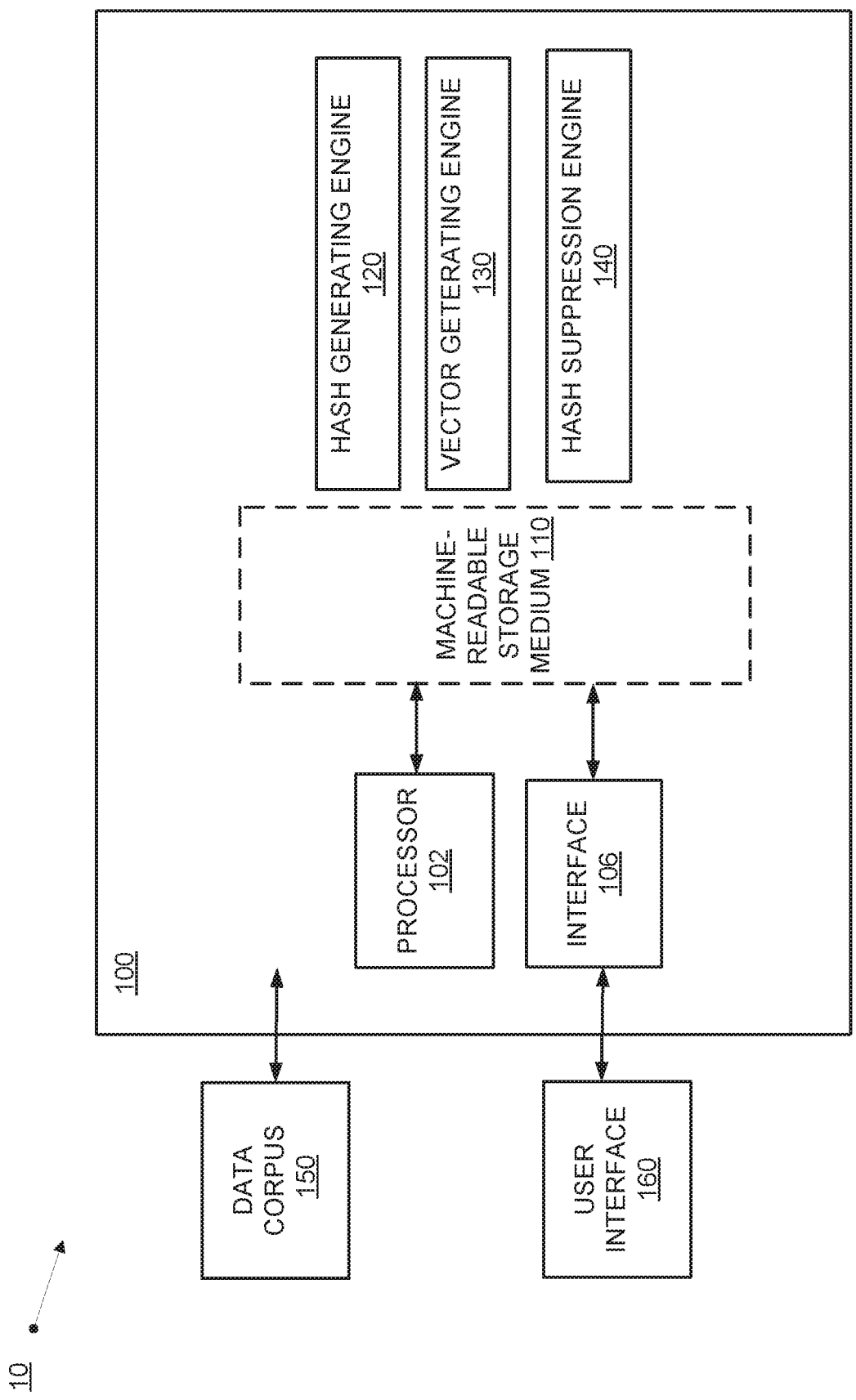
FIG. 1 is a schematic illustration of an example system for suppressing low value hashes and updating a hash index in accordance with an implementation of the present disclosure.

Many entities (e.g., enterprises, organizations) utilize databases for storage of data relating to the entities. For example, a business may maintain a database of customer information, and the customer information may be accessed by querying the database. Further, entities may generally store vast amounts of data originating from their business, including operations data, customer feedback data, financial data, Human Resource data, and so forth. Data stored in these databases may be accessed and updated for various purposes.

As described above, data stored in a database may be accessed and analyzed in real-time for various purposes. For example, methods for analyzing big data are of great interest in many applications, including similarity search, collaborative filtering, data compression, retrieval, clustering, and classification.

One technique for analyzing large amounts of data is hashing and, for example, hash-based indexing. In general, hashing is the transformation of a data object (e.g., vectors of numbers, string of characters, etc.) into at least one shorter fixed-length value or key (i.e., a hash) that represents the original data object. In many situations, a plurality of hashes may be generated from a data object. As used herein, the terms "data object" and "object" are to be used interchangeably and refer to a data component (e.g., vector of numbers) that, for example, may be stored in a database. A specific example of a hash is a concomitant rank order ("CRO") hash. Hashing may be used to index and retrieve objects in a database because two data objects that are similar tend to have more hashes in common and, therefore, using hashes for indexing may help to retrieve objects by similarity.

However, when analysis is performed on very large amounts of data, the plurality of objects in the database(s) may generate multiple hashes many of which are of low importance. For example, many of the hashes may have IDs of multiple objects assigned to them. When a hash has multiple object IDs assigned to it that means that the hash was generated from multiple data objects. In that situation, it may be difficult to use such hashes to differentiate between objects because many objects share the same hash. Such hashes may be identified as low importance hashes and may be desirable to remove or suppress these low important hashes before performing any analytic action with the different types of data.

As noted above, hash-based indexing has proved to be a valuable technique for a variety of analytical operations including similarity-based search and clustering. In all these applications, it is beneficial to reduce the size of the hash index and improve the discriminatory power of the hashes by eliminating the hashes that have low importance and are associated with an excessive number of objects. By suppressing these low importance hashes, the size of the hash index may be significantly reduced and this will also improve the retrieval accuracy of all analytic processes. As an example, for face retrieval analysis hash suppression enhances the efficiency and accuracy of the retrieval algorithm.

Existing tools and techniques for indexing high velocity data streams in real time are not adequate to efficiently update an incremental hash index and improve the performance and the accuracy of the data analysis. In this regard, according to examples, computer-implemented system and techniques for suppressing low value hashes and incrementally updating a hash index are disclosure herein. In one example, the proposed techniques may suppress low-discriminative hashes in a high velocity data stream before performing an action with the objects in the data stream (e.g., classification, clustering, etc.).

In one implementation, the techniques described herein propose suppressing selected hashes for a group of data objects (e.g., CRO hashes) and, therefore, pruning the hash set generated for each given object. The proposed techniques enable updating and maintaining an incremental hash index with high discriminative power resulting in better analysis of the data in terms of accuracy and efficiency for various tasks such as retrieval, classification, clustering, etc. Therefore, using the proposed techniques improves the performance of the task that follows the hashing process.

In one example, a processor may generate a set of hashes for each of a plurality of objects and may compute a high-dimensional sparse vector for each object, where the vector represents the set of hashes for each object. The processor may also compute a combined high-dimensional sparse vector from the high-dimensional sparse vectors for all objects and may compute a hash suppression threshold. The processor may further determine a group of hashes to be suppressed by using the hash suppression threshold and may suppress the group of selected hashes when performing a task or an action (e.g., clustering, classification, etc.).

In the following detailed description, reference is made to the accompanying drawings, which form a part hereof, and in which is shown by way of illustration specific examples in which the disclosed subject matter may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. Furthermore, the term "based on," as used herein, means "based at least in part on." It should also be noted that a plurality of hardware and software based devices, as well as a plurality of different structural components may be used to implement the disclosed methods and devices.

Referring now to the figures, FIG. 1 is a schematic illustration of an example system 10 for suppressing low value hashes and updating a hash index. The illustrated system 10 is capable of carrying out the techniques described below. As shown in FIG. 1, the system 10 is depicted as including at least one computing device 100 (e.g., application server, compute node, desktop or laptop computer, smart phone, etc.). In the embodiment of FIG. 1, computing device 100 includes a processor 102, an interface 106, and a machine-readable storage medium 110. Although only computing device 100 is described in details below, the techniques described herein may be performed by several computing devices or by engines distributed on different devices. Thus, the computing device 100 may or may not be an independent computing device. The computing device 100 may include additional components and some of the components depicted therein may be removed and/or modified without departing from a scope of the system that allows for carrying out the functionality described herein.

In one example, the computing device 100 (or another computing device) may communicate with a data corpus 150 and with an interactive user interface 160 (e.g., graphical user interface). The data corpus 150 may include different types of data objects. The data in the data corpus 150 may include text-like data, categorical data, numerical data, structured data, unstructured data, or any other type of data. The device 100 may receive an incoming data stream of data objects (e.g., vectors of numbers, etc.) from the data corpus 150.

The computing device 100 may implement engines 120-140 (and components thereof) in various ways, for example as hardware and programming. Each of the engines 120-140 may include, for example, a hardware device including electronic circuitry for implementing the functionality described below, such as control logic and/or memory. In addition or as an alternative, the engines 120-140 may be implemented as any combination of hardware and software to implement the functionalities of the engines. The programming for the engines 120-140 may take the form of processor-executable instructions stored on a non-transitory machine-readable storage medium and the hardware for the engines 120-140 may include a processing resource to execute those instructions. A processing resource may include a number of processors and may be implemented through a single processor or multi-processor architecture. In an alternative example, engines 120-140 may be distributed between the computing device 100 and other computing devices. It is to be understood that the operations described as being performed by the engines 120-140 of the computing device 100 that are related to this description may, in some implementations, be performed by external engines (not shown) or distributed between the engines of the computing device 100 and other electronic/computing devices.

Processor 102 may be central processing unit(s) (CPUs), microprocessor(s), and/or other hardware device(s) suitable for retrieval and execution of instructions (not shown) stored in machine-readable storage medium 110. Processor 102 may fetch, decode, and execute instructions to identify different groups in a dataset. As an alternative or in addition to retrieving and executing instructions, processor 102 may include electronic circuits comprising a number of electronic components for performing the functionality of instructions.

Interface 106 may include a number of electronic components for communicating with various devices. For example, interface 106 may be an Ethernet interface, a Universal Serial Bus (USB) interface, an IEEE 1394 (Firewire) interface, an external Serial Advanced Technology Attachment (eSATA) interface, or any other physical connection interface suitable for communication with the computing device. Alternatively, interface 106 may be a wireless interface, such as a wireless local area network (WLAN) interface or a near-field communication (NFC) interface that is used to connect with other devices/systems and/or to a network. The user interface 160 and the computing device 100 may be connected via a network. In one example, the network may be a mesh sensor network (not shown). The network may include any suitable type or configuration of network to allow for communication between the computing device 100, the user interface 160, and any other devices/systems (e.g., other computing devices, displays), for example, to send and receive data to and from a corresponding interface of another device.

In one example, the hash generating engine 120 may generate a set of hashes for each of a plurality of objects (e.g., received from the data corpus 150). As noted above, the data corpus may include various data objects. Various techniques may be used to generate the set of hashes for each object. In one example, the hashes are CRO hashes.

The vector generating engine 130 may compute a high-dimensional sparse vector for each object, where the vector represents the set of hashes for each object. In addition, the vector generating engine 130 may compute a combined high-dimensional sparse vector from the high-dimensional sparse vectors for all objects, where the combined high-dimensional sparse vector indicates how many individual objects include each hash.

The hash suppression engine 140 may compute a hash suppression threshold, may determine a group of hashes to be suppressed by using the hash suppression threshold, and may suppress the group of selected hashes when performing an action (e.g., clustering, etc.). For example, the hash suppression engine 140 may compute a sum and a sum of squares of all elements of the combined high-dimensional sparse vector, may compute a mean and a standard deviation of all elements of the combined high-dimensional sparse vector, and may using the mean, the standard deviation, and a hash suppression factor to compute the hash suppression threshold.

In addition, the hash suppression engine 140 may determine whether the hashes for a new object are included in the group of suppressed hashes and may remove the suppressed hashes from the set of hashes for the new object. That way, the hash suppression threshold may be computed incrementally, the system may process each new objects as it comes in, and may update the group of suppressed hashes without analyzing the previously ingested objects.

Figure 2:
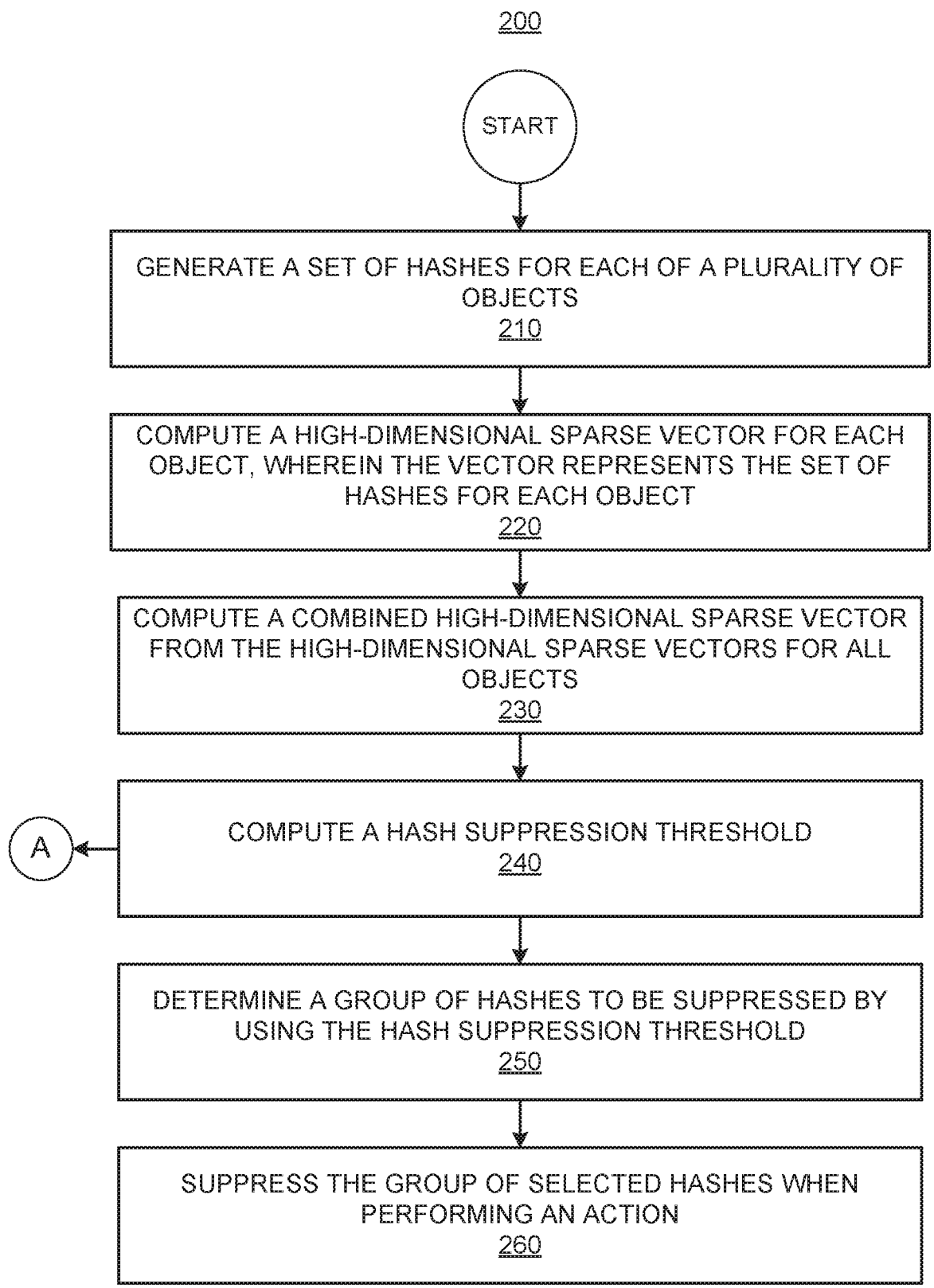
FIG. 2 illustrates a flowchart showing an example of a method for suppressing low value hashes in accordance with an implementation of the present disclosure.

FIG. 2 illustrates a flowchart showing an example of a method 200 for suppressing low value hashes. Although execution of the method 200 is described below with reference to the system 10, the components for executing the method 200 may be spread among multiple devices/systems. The method 200 may be implemented in the form of executable instructions stored on a machine-readable storage medium, and/or in the form of electronic circuitry.

In one example, the method 200 can be executed by at least one processor (e.g., processor 102 of device 100). In other examples, the method may be executed by another processor in communication with the system 10. Various elements or blocks described herein with respect to the method 200 are capable of being executed simultaneously, in parallel, or in an order that differs from the illustrated serial manner of execution. The method 200 is also capable of being executed using additional or fewer elements than are shown in the illustrated examples.

The method 200 begins at 210, where a processor may generate a set of hashes (e.g., CRO hashes) for each of a plurality of objects. Various techniques may be used to generate the hashes for each object. For example, a processor may receive an input set of objects I={$O_1, O_2 \ldots O_N$} from the data corpus 150. Then, the processor may generate a hash set h(O) for each object $O_i$, from the set of objects I, where the elements of h(O) may be drawn from a large hash universe of numbers (e.g., 1 ... U). In other words, for each object $O_i$ the processor may generate a set of hashes h(O) or numbers that have values between 1-U. In one example, when ten hashes are generated for each object $O_i$, then h(O) may be a set of ten numbers where each number is a hash (i.e., each number is between 1-U).

At 220, the processor may compute a high-dimensional sparse vector O* for each object $O_i$, where the vector represents the set of hashes h(O) for each object $O_i$. In other words, the processor may transform the data object $O_i$ to a high-dimensional sparse binary vector O* having a dimension U. For example, each element of the dimension in the vector may be a real number and the dimension U may be very large. In one implementation, O* is an array or vector of length U, where all numbers are zero except the places or locations corresponding with the hashes in the hash set h(O) for each object. So, if the hash set h(O) includes number 1, 2 and 5, then O* is a vector having various zero values except at locations 1, 2, and 5. In one implementation, the high-dimensional sparse binary vector O* may be computed by using the following equation:

$$O^*[i] = \begin{cases} 1 \text{ if } i \in h(O) \\ 0 \text{ if } i \notin h(O) \end{cases} \quad \text{(Eqn. 1)}$$

Next, the processor may compute a combined high-dimensional sparse vector from the high-dimensional sparse vectors O* for all objects (at 230). For example, the processor may add all the vectors for all the object at each of their coordinates/locations. The result is a combined high-dimensional sparse vector, where each of the coordinates or elements of the new vector is a sum of the coordinates of all added/existing vectors. In one implementation, the combined high-dimensional sparse vector may be computed by using the following equation:

$$C = \sum_{i=1}^{N} O_i^* \quad \text{(Eqn. 2)}$$

In Equation 2, C represents the combined high-dimensional sparse vector and N represents the number of input objects (e.g., vectors of numbers). In one example, the combined high-dimensional sparse vector indicates how many individual objects include each hash. In other words, the combined high-dimensional sparse vector may show how many times each of the hashes is used or included in each of the plurality of data objects.

At 240, the processor may compute a hash suppression threshold. As explained in additional details below, the hash suppression threshold may be used to identify a set of hashes to be suppressed by the processor. An example technique for computing the hash suppression threshold is described below in relation to FIG. 3.

At 250, the processor may determine a group of hashes to be suppressed by using the hash suppression threshold. In one example, the processor may determine a group of hashes to be suppressed by applying the following equation:

$$B = \{i : C[i] > \tau\} \quad \text{(Eqn. 3)}$$

In equation 3, B represents the group of hashes to be suppressed (i.e., the set of coordinates for the combined high-dimensional sparse vector C), and $\tau$ is the hash suppression threshold. For example, when the hashes for the objects are generated, the processor may compare all hashes to the hash suppression threshold. If it is determined that a hash is above the hash suppression threshold, the processor may flag that hash for removal/suppression. In other words, the processor computes a list of hashes that should be suppressed, i.e. they should not be used for indexing objects and should be ignored during the data retrieval and analysis process.

Next, the processor may suppress the group of selected hashes when performing an action (e.g., retrieval, classification, etc.) (at 260). For example, any time the system attempts to perform an action (e.g., based on a user request via the user interface 160), the processor may suppress the group of selected hashes and then proceeds to perform the action. In the alternative, the processor may consistently suppress the group of selected hashes in scheduled or unscheduled intervals without an actual request for an action. When a hashes for a new object are generated, the processor may check whether these hashes are in the group of hashes to be suppressed and may remove them from the hash set associated to the object if they are. As noted above, the benefit of this is that the hashes that have a large number of associated objects are not very useful as discriminators between objects. By suppressing these hashes, the processor significantly reduces the size of the hash index, and also improves the retrieval/analysis accuracy of the data.

In one example, the process described above may be executed as a batch algorithm (i.e., where all the objects in the set are known beforehand). In another example, the techniques described above may also be applied to streaming applications, where data objects are received in a sequential manner. In that example implementation, an incremental version of the algorithm would process each new data object as it comes in, and will update the threshold and the group of selected hashes without having to touch the previously evaluated objects. An example of this incremental update is described in more details below in relation to FIG. 5.

Figure 3:
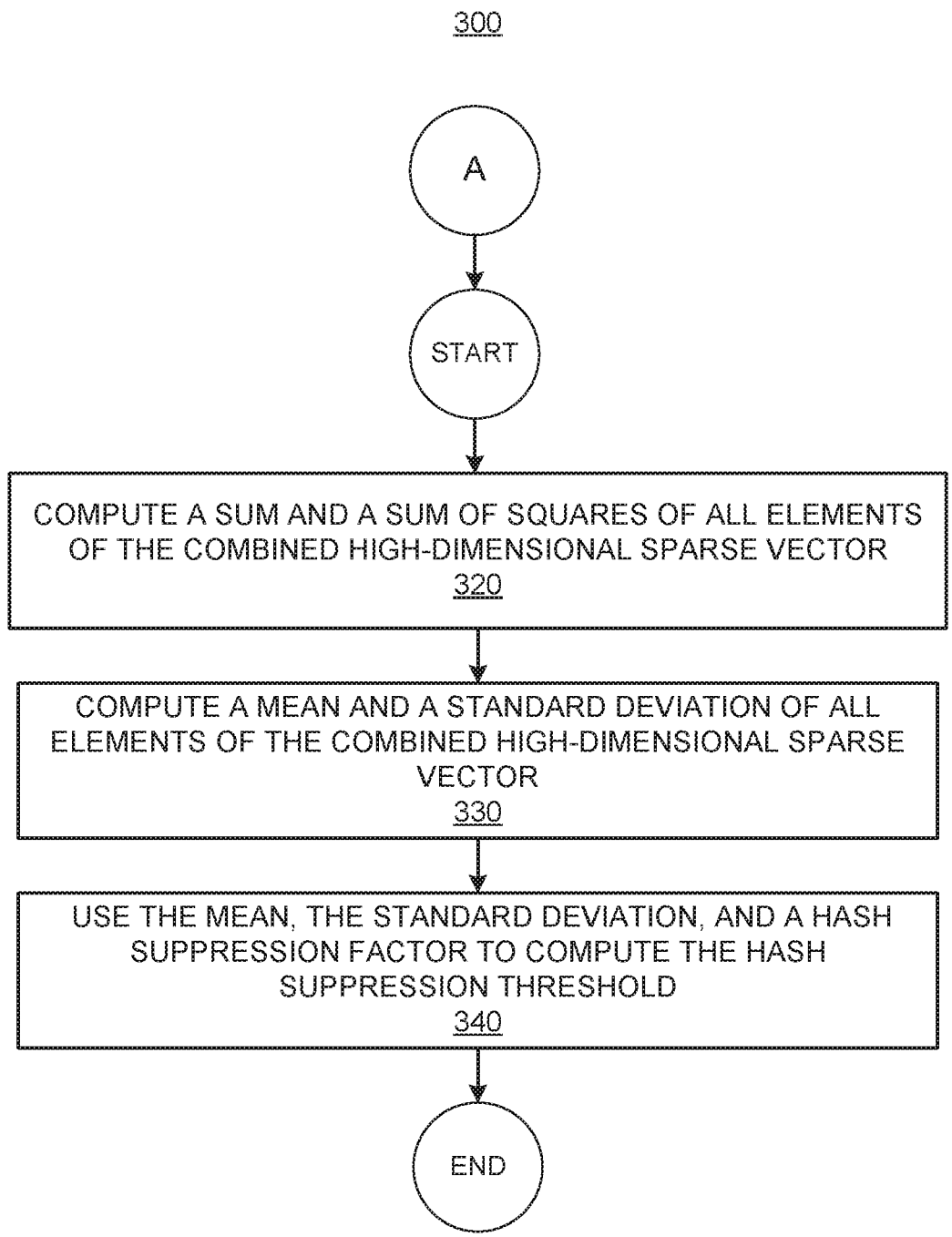
FIG. 3 illustrates a flowchart showing an example of a method for determining a hash suppression threshold in accordance with an implementation of the present disclosure.

FIG. 3 illustrate a flowchart showing an example of a method 300 for determining a hash suppression threshold. Although execution of the method 300 is described below with reference to the system 10, the components for executing the method 300 may be spread among multiple devices/systems. The method 300 may be implemented in the form of executable instructions stored on a machine-readable storage medium, and/or in the form of electronic circuitry. In one example, the method 300 can be executed by at least one processor of a computing device (e.g., processor 102 of device 100).

The method 300 begins at 320, where a processor may compute a sum and a sum of squares of all elements (i.e., coordinates) of the combined high-dimensional sparse vector C. In one example, the sum and a sum of squares of all elements of the combined high-dimensional sparse vector may be computed by using the following equations:

$$S = \sum_{k=1}^{U} C[k] \qquad \text{(Eqn. 4)}$$

$$V = \sum_{k=1}^{U} C^2[k] \qquad \text{(Eqn. 5)}$$

In equations 4 and 5, S represents the sum of all elements in the combined vector C and V represents the sum of squares of all elements in the combined vector C. In some examples, the sum S of all elements in the combined vector C and the sum of squares of all elements may be a real number (e.g., the total number of hashes in all the objects).

Next, the processor may compute a mean and a standard deviation of all elements of the combined high-dimensional sparse vector (at 330). In one example, the mean and the standard deviation of all elements of the combined high-dimensional sparse vector may be computed by using the following equations:

$$\mu = \frac{S}{U} \qquad \text{(Eqn. 6)}$$

$$\sigma = \sqrt{\frac{V}{U} - \mu^2} \qquad \text{(Eqn. 7)}$$

In equations 6 and 7, $\mu$ represents the mean of all elements of the combined high-dimensional sparse vector, $\sigma$ represents the standard deviation of all elements of the combined high-dimensional sparse vector, and U represents the total number of possible hashes. In one example, the mean $\mu$ represents the average count that every hash is found in X number of objects and the standard deviation $\sigma$ represents how the hashes are dispersed between the plurality of objects.

At 340, the processor may use the mean, the standard deviation, and a hash suppression factor to compute the hash suppression threshold. In one example, the hash suppression threshold may be computed by using the following equation:

$$\tau = \mu + \alpha \sigma \qquad \text{(Eqn. 8)}$$

In equation 8, $\mu$ represents the hash suppression threshold. As shown, the processor uses the mean and the standard deviation of all elements of the combined high-dimensional sparse vector, plus a hash suppression factor to compute the hash suppression threshold. The hash suppression factor $\alpha$ may be a constant number (e.g., 1.5, etc.) used to assist with the computation of $\mu$. As noted above, by suppressing low value hashes the processor not only increases the discriminative power of hashing algorithm, but it also reduces the computational cost of different actions (e.g., retrieval, clustering, classification, etc.) that follow the hashing.

Figure 4:
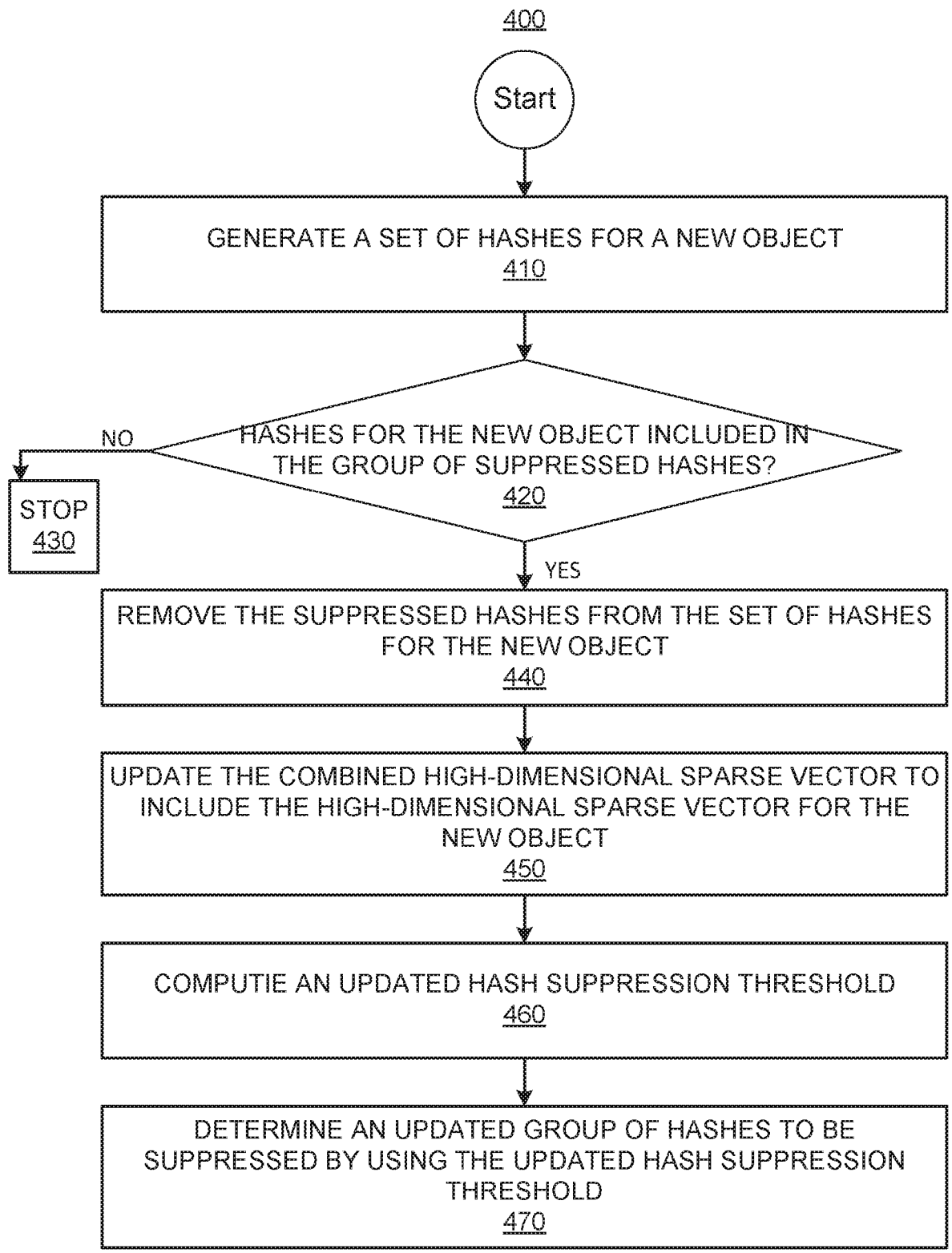
FIG. 4 illustrates a flowchart showing an example of a method for evaluating and suppressing hashes of a new object in accordance with an implementation of the present disclosure.

FIG. 4 illustrates a flowchart showing an example of a method 400 for evaluating and suppressing hashes of a new object. Although execution of the method 400 is described below with reference to the system 10, the components for executing the method 400 may be spread among multiple devices/systems. The method 400 may be implemented in the form of executable instructions stored on a machine-readable storage medium, and/or in the form of electronic circuitry. In one example, the method 400 can be executed by at least one processor of a computing device (e.g., processor 102 of device 100).

The method 400 begins at 410, where the processor may generate a set of hashes for a new object. This process may be similar to the process described in block 210 of method 200. The processor may determine whether the hashes for the new object are included in the group of suppressed hashes (at 420). In one example, this is the group of suppressed hashes that was previously identified by the processor. If the hashes for the new object are not included in the group of suppressed hashes, the processor may stop (at 430). If, however, the hashes for the new object are included in the group of suppressed hashes, the processor may remove the identified suppressed hashes from the set of hashes for the new object (at 440).

Next, the processor may update the combined high-dimensional sparse vector to include the high-dimensional sparse vector for the new object (at 450). An updated combined high-dimensional sparse vector may be computed by using techniques similar to the techniques described in block 230 of the method 200. At 460, the processor may compute an updated hash suppression threshold (e.g., by using the new update the combined high-dimensional sparse vector). The updated hash suppression threshold may be computed by using techniques similar to the techniques described in block 240 of the method 200. At 470, the processor may determine an updated group of hashes to be suppressed by using the updated hash suppression threshold (e.g., similarly to the process described in FIG. 3).

Figure 5:
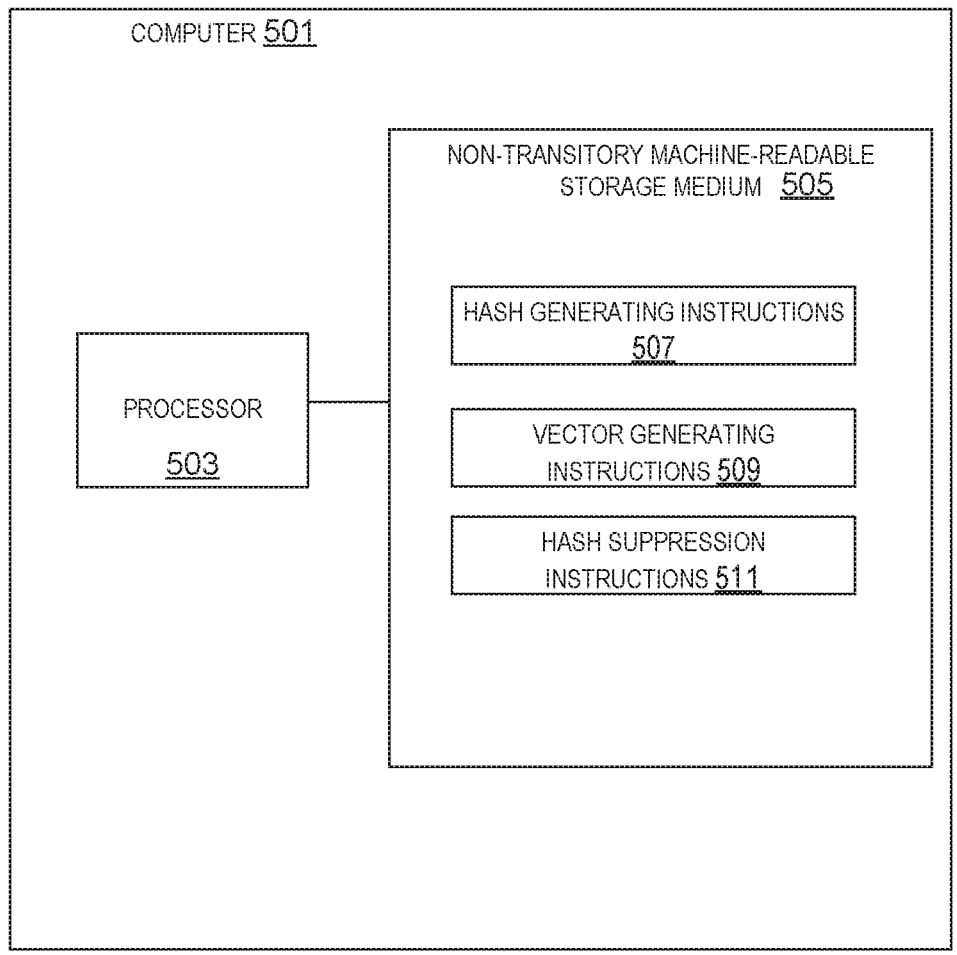
FIG. 5 is an example block diagram illustrating a computer-readable medium in accordance with an implementation of the present disclosure.

FIG. 5 illustrates a computer 501 and a non-transitory machine-readable storage medium 505 according to an example. In one example, the computer 501 maybe similar to the computing device 100 of the system 10 or may include a plurality of computers. For example, the computer may be a server computer, a workstation computer, a desktop computer, a laptop, a mobile device, or the like, and may be part of a distributed system. The computer may include one or more processors and one or more machine-readable storage media. In one example, the computer may include a user interface (e.g., touch interface, mouse, keyboard, or gesture input device).

Computer 501 may perform methods 200-400 and variations thereof. Additionally, the functionality implemented by computer 501 may be part of a larger software platform, system, application, or the like. Computer 501 may be connected to a database (not shown) via a network. The network may be any type of communications network, including, but not limited to, wire-based networks (e.g., cable), wireless networks (e.g., cellular, satellite), cellular telecommunications network(s), and IP-based telecommunications network(s) (e.g., Voice over Internet Protocol networks). The network may also include traditional landline or a public switched telephone network (PSTN), or combinations of the foregoing.

The computer 501 may include a processor 503 and non-transitory machine-readable storage medium 505. The processor 503 (e.g., a central processing unit, a group of distributed processors, a microprocessor, a microcontroller, an application-specific integrated circuit (ASIC), a graphics processor, a multiprocessor, a virtual processor, a cloud processing system, or another suitable controller or programmable device) and the storage medium 505 may be operatively coupled to a bus. Processor 503 can include single or multiple cores on a chip, multiple cores across multiple chips, multiple cores across multiple devices, or combinations thereof.

The storage medium 505 may include any suitable type, number, and configuration of volatile or non-volatile machine-readable storage media to store instructions and data. Examples of machine-readable storage media include read-only memory ("ROM"), random access memory ("RAM") (e.g., dynamic RAM ["DRAM"], synchronous DRAM ["SDRAM"]), electrically erasable programmable read-only memory ("EEPROM"), magnetoresistive random access memory (MRAM), memristor, flash memory, SD card, floppy disk, compact disc read only memory (CD-ROM), digital video disc read only memory (DVD-ROM), and other suitable magnetic, optical, physical, or electronic memory on which software may be stored.

Software stored on the non-transitory machine-readable storage medium 505 and executed by the processor 503 includes, for example, firmware, applications, program data, filters, rules, program modules, and other executable instructions. The processor 503 retrieves from the machine-readable storage medium 505 and executes, among other things, instructions related to the control processes and methods described herein.

The processor 503 may fetch, decode, and execute instructions 507-511 among others, to implement various processing. As an alternative or in addition to retrieving and executing instructions, processor 503 may include at least one integrated circuit (IC), other control logic, other electronic circuits, or combinations thereof that include a number of electronic components for performing the functionality of instructions 507-511. Accordingly, processor 503 may be implemented across multiple processing units and instructions 507-511 may be implemented by different processing units in different areas of computer 501.

The instructions 507-511 when executed by processor 503 (e.g., via one processing element or multiple processing elements of the processor) can cause processor 503 to perform processes, for example, methods 200-400, and/or variations and portions thereof. In other examples, the execution of these and other methods may be distributed between the processor 503 and other processors in communication with the processor 503. In one implementation, instructions 507-511 may represent incremental techniques that process each new data object as it comes in, and update the threshold and the group of selected hashes without having to touch the previously evaluated objects.

For example, hash generating instructions 607 may cause processor 503 to generate a set of hashes for a first object. These instructions may function similarly to the techniques described in block 210 of method 200.

Vector generating instructions 509 may cause the processor 503 to compute a high-dimensional sparse vector for the first object, where the vector represents the set of hashes for each object. These instructions may function similarly to the techniques described block 220 of method 200. Further, vector generating instructions 509 may cause the processor 503 to compute a combined high-dimensional sparse vector. The combined high-dimensional sparse vector indicates how many individual objects include each hash. These instructions may function similarly to the techniques described block 230 of method 200.

Hash suppression instructions may cause the processor 503 to compute a hash suppression threshold and to suppress the group of selected hashes that are above the hash suppression threshold when performing an action. These instructions may function similarly to the techniques described blocks 240-260 of method 200.

When a new object arrives, the hash generating instructions 607 may cause processor 503 to generate a set of hashes for the new/second object. Vector generating instructions 509 may cause the processor 503 to compute a high-dimensional sparse vector for the second object and to update the combined high-dimensional sparse vector to include the high dimensional sparse vector for the second object. These instructions may function similarly to the techniques described block 220 of method 200 and the techniques described block 450 of method 400.

The hash suppression instructions 511 may also cause the processor 503 to compute an updated hash suppression threshold and to determine an updated group of hashes to be suppressed by using the updated hash suppression threshold. These instructions may function similarly to the techniques described blocks 450-470 of method 400. That way, the instructions of the computer 501 may incrementally update the suppression threshold and the group of hashes to be suppressed for every new object that arrives.

Hash suppression instructions 511 may further cause the processor 503 to determine whether the hashes for the second object are included in the initial the group of suppressed hashes, and to remove the suppressed hashes from the set of hashes for the second object. These instructions may function similarly to the techniques described blocks 410-440 of method 400.

In the foregoing description, numerous details are set forth to provide an understanding of the subject matter disclosed herein. However, implementations may be practiced without some or all of these details. Other implementations may include modifications and variations from the details discussed above. It is intended that the appended claims cover such modifications and variations.

What is claimed is:

1. A method comprising:
   generating, via a processor, a set of hashes for each of a plurality of objects;
   computing, via the processor, a high-dimensional sparse vector for each object, wherein the vector represents the set of hashes for each object;
   computing, via the processor, a combined high-dimensional sparse vector from the high-dimensional sparse vectors for all objects;
   computing, via the processor, a sum and a sum of squares of all elements of the combined high-dimensional sparse vector;
   computing, via the processor, a mean and a standard deviation of all elements of the combined high-dimensional sparse vector;
   computing, via the processor, a hash suppression threshold using the mean, the standard deviation, and a hash suppression factor;
   determining, via the processor, a group of hashes to be suppressed by using the hash suppression threshold; and
   suppressing, via the processor, the group of selected hashes when performing an action.

2. The method of claim 1, further comprising:
   generating, via the processor, a set of hashes for a new object;
   determining, via the processor, whether the hashes for the new object are included in the group of suppressed hashes; and
   removing, via the processor, the suppressed hashes from the set of hashes for the new object.

3. The method of claim 2, further comprising:
   updating, via the processor, the combined high-dimensional sparse vector to include the high-dimensional sparse vector for the new object;
   computing, via the processor, an updated hash suppression threshold; and
   determining, via the processor, an updated group of hashes to be suppressed by using the updated hash suppression threshold.

4. The method of claim 1, wherein the combined high-dimensional sparse vector indicates how many individual objects include each hash.

5. The method of claim 1, wherein the hashes are concomitant rank order hashes.

6. A system comprising:
- an hash generating engine to generate a set of hashes for each of a plurality of objects;
- a vector engine to:
  - compute a high-dimensional sparse vector for each object, wherein the vector represents the set of hashes for each object, and
  - compute a combined high-dimensional sparse vector from the high-dimensional sparse vectors for all objects, wherein the combined high-dimensional sparse vector indicates how many individual objects include each hash; and
- a hash suppression engine to:
  - compute a sum and a sum of squares of all elements of the combined high-dimensional sparse vector;
  - compute a mean and a standard deviation of all elements of the combined high-dimensional sparse vector; and
  - compute a hash suppression threshold using the mean, the standard deviation, and a hash suppression factor;
  - determine a group of hashes to be suppressed by using the hash suppression threshold, and
  - suppress the group of selected hashes when performing an action.

7. The system of claim 6, wherein the hash generating engine and the hash suppression engine are further to:
- generate a set of hashes for a new object;
- determine whether the hashes for the new object are included in the group of suppressed hashes; and
- remove the suppressed hashes from the set of hashes for the new object.

8. The system of claim 7, wherein the hash suppression engine is further to:
- update the combined high-dimensional sparse vector to include the high dimensional sparse vector for the new object;
- compute an updated hash suppression threshold; and
- determine an updated group of hashes to be suppressed by using the updated hash suppression threshold.

9. The system of claim 6, wherein the hashes are concomitant rank order hashes.

10. A non-transitory machine-readable storage medium encoded with instructions executable by at least one processor, the machine-readable storage medium comprising instructions to:
- generate a set of hashes for a first object;
- compute a high-dimensional sparse vector for the first object, wherein the vector represents the set of hashes for each object;
- compute a combined high-dimensional sparse vector;
- compute a sum and a sum of squares of all elements of the combined high-dimensional sparse vector;
- compute a mean and a standard deviation of all elements of the combined high-dimensional sparse vector;
- compute a hash suppression threshold using the mean, the standard deviation, and a hash suppression factor;
- suppress the group of selected hashes that are above the hash suppression threshold when performing an action;
- generate a set of hashes for a second object and compute a high-dimensional sparse vector for the second object;
- update the combined high-dimensional sparse vector to include the high dimensional sparse vector for the second object;
- compute an updated hash suppression threshold; and
- determine an updated group of hashes to be suppressed by using the updated hash suppression threshold.

11. The non-transitory machine-readable storage medium of claim 10, further comprising instructions to:
- determine whether the hashes for the second object are included in the initial group of suppressed hashes; and
- remove the suppressed hashes from the set of hashes for the second object.

12. The non-transitory machine-readable storage medium of claim 10, wherein the combined high-dimensional sparse vector indicates how many individual objects include each hash.

* * * * *